UNITED STATES PATENT OFFICE.

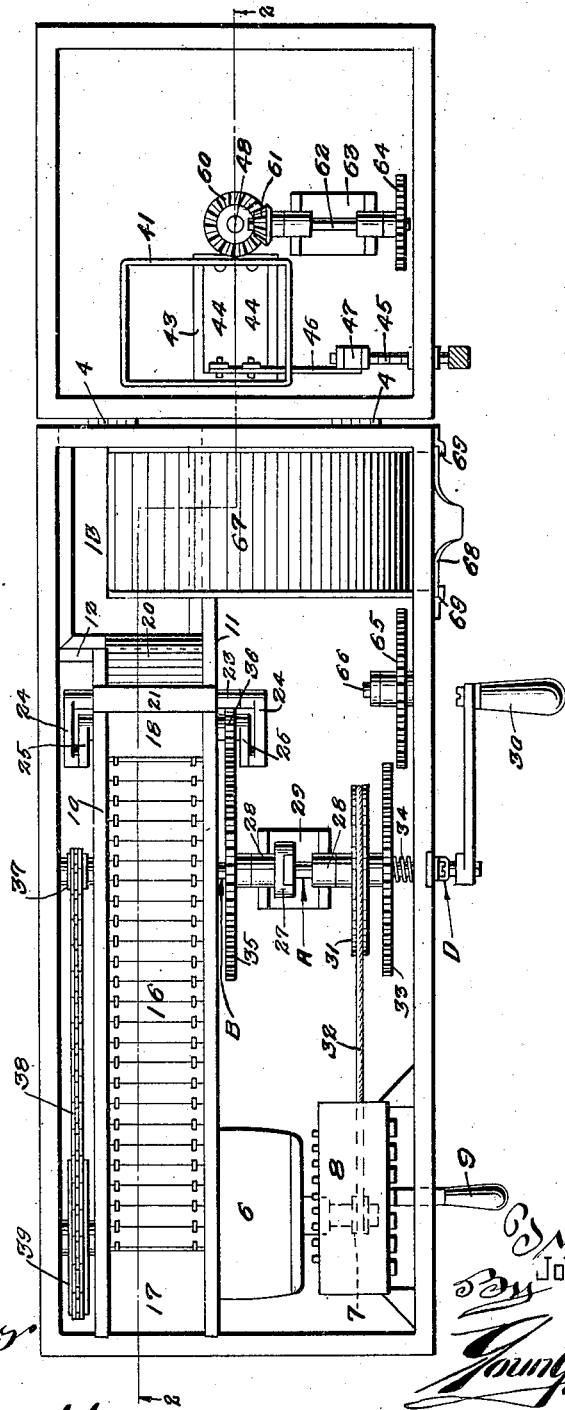

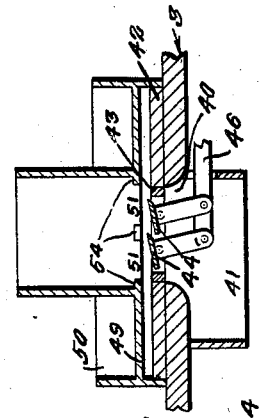

JOHN HARTMAN, OF MILWAUKEE, WISCONSIN.

VEGETABLE-CUTTING MACHINE.

1,378,451.  Specification of Letters Patent.  Patented May 17, 1921.

Application filed July 27, 1920. Serial No. 399,325.

*To all whom it may concern:*

Be it known that I, JOHN HARTMAN, a citizen of the United States, and resident of Milwaukee, in the county of Milwaukee and State of Wisconsin, have invented certain new and useful Improvements in Vegetable-Cutting Machines; and I do hereby declare that the following is a full, clear, and exact description thereof.

My invention relates to improvements in machines for cutting vegetable products and the like.

The object of my invention is to construct a machine of the character described having two cutters of different types operated by a common driving mechanism.

A further object of my invention is to provide means for operating the cutters independently of each other, and a part of said means being common to both.

A further object of my invention is to construct a machine of the character described having reciprocating and stationary cutters and rotary means coöperating with the stationary cutters by which the vegetables to be cut are carried. The reciprocating cutter has coöperating therewith an endless carrier upon which the vegetables to be cut are placed and brought into contact with the cutter. This cutter if desired may be used for slicing noodles or the like from dough.

A further object of my invention is to provide means for adjusting the angle of the stationary cutters so as to vary the thickness of the slices.

In the drawings:—

Figure 1 is a top plan view of the machine with the top of its casing thrown back, disclosing the reciprocating cutter and its operating means within the casing and the stationary cutters carried by the top.

Fig. 2 is a longitudinal sectional view on the line 2—2 of Fig. 1, showing the top of the casing closed.

Fig. 3 is a detail sectional view of the stationary cutter.

Referring now to the drawings in detail, the numeral 1 designates a casing made of wood or the like, in which one of the cutters and the operating mechanism for both cutters are mounted, said casing being mounted upon suitable supporting legs or the like 2. The casing has a top member 3 hingedly connected thereto, as at 4, and on the upper portions of which the second cutter is mounted. Referring to Fig. 1, it will be seen that the top 3 only covers approximately one half the casing, while the other portion is closed by the cover 5 which may be fitted upon the casing 1 in any desired manner.

The operating means for one of the cutters consists of an electric motor 6, having the drive pulley 7 arranged within the casing at one of its ends. The speed of the motor 6 is regulated by the rheostat 8 arranged adjacent to the motor 6 and fixed to the inner side of the casing 1 and having its operating handle 9 projecting therethrough.

Extending longitudinally within the casing are vertically disposed partitions 10 and 11, one of which 11 extends the full length of the casing while the other 10 abuts against a partition 12 or the like which extends transversely of the casing between the partition 11 and the side of the casing.

Slidably arranged through the end of the casing is a drawer or receptacle 13 which moves between the partitions 11 and the side of the casing, while its movement is limited by the partition 12.

Mounted between the partitions 10 and 11 and upon shafts 14 and 15 is an endless conveyer 16 formed of bars or the like hingedly connected together, and arranged at each end thereto, and secured to the members 10 and 11, are plates 17 and 18 which form shelves at each end of the conveyer.

The plate 18 has a shearing edge 19 which coöperates with the cutting element, hereinafter described, and extending therefrom is a downwardly inclined chute 20, which directs the cuttings from the cutting element into the receptacle 13. The free end of the chute is supported upon the partition 12, hereinbefore described.

Secured to the partitions 10 and 11 is a U-shaped member 21, the legs of which are provided with slots or guides 22 in which the cutting knife 23 is adapted to be reciprocated. This member 21 is so positioned that the cutting knife coöperates with the cutting edge 19 of the plate 18.

The cutter 23 has its ends projecting beyond the guides 22 and pivotally mounted thereon are links 24, which are likewise secured to the links or arms 25 fixed upon the ends of the rotary shaft 26.

Extending transversely of the casing 1 and midway thereof, is a driven shaft which is formed of two sections A and B, which form a continuous shaft by means of the clutch 27.

The adjacent ends of the sections A and B are journaled in suitable bearings 28 carried by the U-shaped member 29 arranged in the bottom of the casing.

The section A of the shaft has its end portions extending through the side of the casing, and secured thereto is the hand crank 30, while the end portion of the section B is journaled in the side of the casing 1.

The section A has secured thereto the pulley 31, around which passes the drive belt 32 from the pulley 7 of the motor. Also secured to the section A, is a large gear 33, the purpose of which will be hereinafter described.

The clutch 27 is normally held in engagement by means of a coil spring 34 encircling the shaft section A between the side of the casing and the gear 33.

Section B has secured thereto adjacent its bearing the gear 35 which meshes with a small gear 36 secured to the shaft 26 which operates the cutter.

The other end of the shaft section B has secured thereto the sprocket wheel 37 around which passes the sprocket chain 38 from a large sprocket wheel 39, secured to the end of the shaft 14 of the endless conveyer.

From the structure now described, it will be seen that when the vegetable to be sliced is placed upon the conveyer 16 and the motor 6 started, the conveyer will be caused to move through its several driving elements and carry the vegetable under the knife. The knife is also caused to reciprocate at the same time the motor is started through its driving elements, and as the knife descends, a slice will be cut from the object and directed to the receptacle 13 by means of the chute 20.

Referring now to the second cutter, the top 3, has cut therein an opening 40 in which is arranged the depending flange 41.

Secured to the upper portion of the top 3 is an annular plate 42 also provided with an opening corresponding to the opening 40. This opening has secured therein the rectangular frame 43 in which the cutters 44 are pivotally mounted, the angle of which may be varied at the will of the operator by means of the threaded shaft 45 which is rotatably journaled in the depending sides of the top 3, to which the cutters are connected by means of the bar 46 and the threaded sleeve 47 movable upon the threaded shaft 45.

Rotatably mounted in the top 3 and passing through the center of the annular plate 42 is a vertical shaft 48, to the upper part of which is secured a metallic disk 49 having the vertical wall 50 arranged on its periphery, the lower portion of which serves to hold the disk at its proper distance from the annular plate 42 in which the cutters are mounted. The disk 49 is provided with any number of cut-out portions 51 which may be of any desired shape.

Secured to the disk 49 in any convenient manner and adjacent the openings 51, are vertically extending walls 52 which form cup-like receptacles upon the disk 49, in which the article to be sliced is placed. Arranged within each of these receptacles is a plunger 53 which rests upon inwardly projecting fingers 54 formed from the body of the disk.

The disk has secured thereto the hub 55 through which the shaft 48 passes. The upper end of the hub has a small disk 56 which joins it with the walls 52 of the receptacles.

Secured rigidly to the disk 56 and extending vertically therefrom are arms 57, the upper ends of which are bent at right angles and pass over the center of the receptacles. Slidably arranged adjacent the ends of these arms and extending vertically therethrough are rods 58, the lower ends of which are connected to the plunger 53 which are normally forced downwardly by means of springs 59 which encircle the rods 58 between the plunger and the rods 57.

The lower end of the shaft 43 has secured thereto the bevel gear 60 which meshes with a second gear 61 secured at one end of the shaft 62 and rotatably held to the underside of the top 3 by means of the suitable bearings carried by the U-shaped member 63 secured to the underside of the top 3. The other end of the shaft 62 has secured thereto the gear 64 which when the top is closed as shown in Fig. 2, meshes with the gear 65 loosely mounted upon the stub shaft 66 secured within and to the side portion of the casing 1.

Assuming now that the operator desires to use the cutter just described, he closes the top 3 of the casing 1 which causes the gear 64 to engage the gear 65. The operator then grasps the handle 30 and by pulling on same causes the spring 34 to be compressed and thereby disengaging the clutch 27. A continued pull will cause the gear 33 to engage the gear 65.

If desired, the end portion of the shaft section A may be provided with an annular groove which when the shaft is pulled out will receive suitable locking means which I have indicated at D and thus hold the shaft section A against the tension of the spring and the gear 33 in engagement with the gear 65.

The operator then places the vegetable to be cut in the receptacles, which is then forced down upon the plate 42 by the plunger. The cutters are then adjusted accordingly. The crank handle 30 is then turned and power is transmitted to the rotary disk through the gear 33, 65, 64, shaft 62 and the gear 61 and 60, then to the rotary disk.

As the disk rotates the vegetable carried thereby will be passed over the cutters, and as they do so, shavings or slices will be cut therefrom and directed into the receptacle 67 by the flanges 44. The receptacle 67 is arranged above the receptacle 13 and rigidly secured to the inner side of the casing.

The bottom of the receptacle 67 is inclined and leads to an outlet cut in one of the sides of the casing 1, this being closed by a plate 68 sliding in the guides 69 secured to the outside of the casing.

Having thus fully described my invention, what I claim as new, and desire to secure by Letters Patent, is:—

1. A machine of the class described comprising a casing and a cover therefor, cutting means carried by the cover, and means within the casing and adapted to operate said cutting means when the cover is closed.

2. A machine of the class described comprising a casing and a cover therefor, cutting blades arranged within the cover and adapted to coact with article carrying means rotated on the cover, and manually operated means within the casing adapted to engage and rotate said article carrying means when the cover is closed.

3. A machine of the class described comprising a casing and a cover therefor, adjustable cutting blades arranged on the cover, a rotary shaft mounted within said cover and adjacent the cutting blades, article carrying means secured to the upper end of the shaft, a gear and its driving means upon the lower end of the shaft and adapted to engage the operating means within the casing when the cover is closed.

4. A machine of the class described comprising a casing and a cover therefor, adjustable cutting blades mounted within the cover, a rotary shaft vertically arranged adjacent said blades and provided on its lower end with driving connections, a disk keyed to the upper portion of the shaft and held in spaced relation to said blades, opening in said disk, article carrying cups surrounding said openings, resilient means for forcing the articles through the openings and in the path of the cutting blades, and means within said casing for rotating said shaft when the cover is closed.

In testimony that I claim the foregoing I have hereunto set my hand at Milwaukee, in the county of Milwaukee and State of Wisconsin.

JOHN HARTMAN.